Feb. 6, 1968 L. ROSE 3,368,216
ROTATABLE DRUM INDICATOR WITH ELECTROMAGNETIC DRUM CONTROL
Filed Oct. 23, 1965

INVENTOR.
LEONARD ROSE
BY
Leonard H. King
ATTORNEY.

United States Patent Office 3,368,216
Patented Feb. 6, 1968

3,368,216
ROTATABLE DRUM INDICATOR WITH ELECTRO-
MAGNETIC DRUM CONTROL
Leonard Rose, Wantagh, N.Y., assignor to Consolidated
Airborne Systems, Inc., New Hyde Park, N.Y.
Filed Oct. 23, 1965, Ser. No. 502,942
4 Claims. (Cl. 340—373)

This invention relates to electromagnetic indicators and more particularly to such indicators employing a rotatable member arranged to visually display either state of a bistable signal being monitored.

Jet aircraft employ a multiplicity of instruments and signalling devices that compete for the attention of the flight crew. Backlighted devices utilizing red light are preferred since white light interferes with the viewer's night vision. Small size and freedom from erroneous operation because of vibration or abnormal G forces are further desirable features. This invention satisfies all of these requirements without incurring the limitations and shortcomings of prior art devices.

Devices of the type to be described hereinafter are suitable for use in instrument panels of vehicles such as aircraft wherein it is desired to monitor different but related conditions. For example, indicators of this type may carry such legends at HOT or COLD, or ON or OFF. Other applicable markings or contrasting colors can also be employed.

Prior art devices in this field have several shortcomings which have tended to limit their utility. Many of the prior devices are not suitable for miniaturization; others utilize members which cannot perform reliably in the presence of vibration or abnormal G forces. Still others employ mechanical motion stops, often failing to provide a full 90° angular deflection.

The present invention provides improvements not available in miniaturized prior art electromagnetic indicators suited for backlighting. By use of an external fixed position magnet, the need for physical stop members is eliminated. A full 90° displacement is provided for the rotor between the energized and the de-energized conditions. Positive attraction is provided for the dynamically balanced rotor in each of the two positions (energized or de-energized), thus greatly reducing the possibility of the indicator "hanging up" or failing to position correctly. The present indicator is small in size with the attendant advantage of low inertia of the rotor together with rapid response and reduced overtravel.

The construction of the present invention provides a coil wound on a core of low retentivity magnetic material and which is long with respect to its diameter or thickness. At the ends of the core pole pieces are affixed, the whole being a U-shaped electromagnet. At the open end of the U, and parallel to the core is journaled a cylindrical rotor having embedded on its curved surface two diametrically opposite permanent magnets extending the full length of the rotor. When the electromagnet is energized, the rotor turns so that one of its permanent magnets positions between the pole pieces of the electromagnet. When the electromagnet is de-energized, the rotor turns through 90° to reposition with the other of the rotor's permanent magnets being attracted to another permanent magnet affixed to the indicator housing, parallel and close to the rotor.

The magnetic circuits have been designed so that the stationary permanent magnet affixed to the indicator housing will readily position the rotor when the electromagnet is de-energized. Likewise, the field of the energized electromagnet is of sufficient strength to turn to rotor through 90° against the force of the stationary magnet.

Accordingly, it is an object of the present invention to provide a compact electromagnetic indicator that does not require physical contact with stop members in order to determine its limits of angular displacement.

A principal object is to provide a miniature, back lighted instrument of the class described.

Another object of the present invention is to provide a low cost, reliable electromagnetic indicator.

An additional object is to provide an electromagnetic indicator capable of a full 90° angular displacement of its indicating media.

A further object of the present invention is to provide an electromagnetic indicator having positive rotor limits in both the energized and de-energized coil conditions.

These and other features, objects and advantages of the invention will, in part, be pointed out with particularity and will, in part, become obvious from the following more detailed description of the invention, taken in conjunction with the accompanying drawing which forms an itegral part thereof.

In the various figures of the drawing like reference characters designate like parts.

Figure 1:
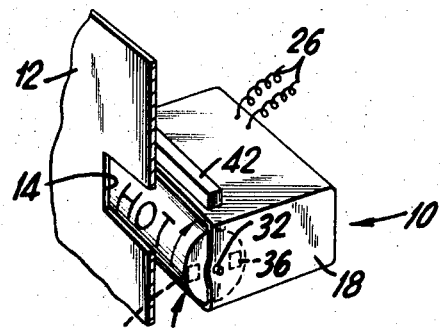
FIG. 1 is an enlarged pictorial view, partly schematic and partly broken away, illustrating the present invention disposed behind an instrument panel.
Figure 2:
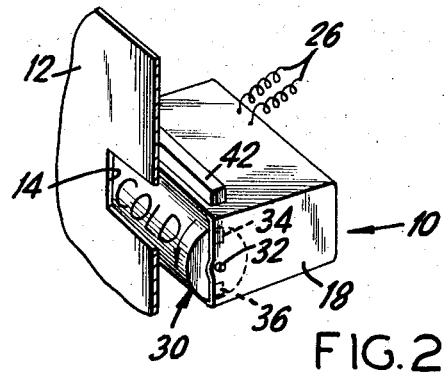
FIG. 2 is a view similar to FIG. 1 illustrating the alternative condition of the indicating device.

Referring now to FIG. 1 and FIG. 2 of the drawing, electromagnetic indicator 10 is mounted behind a panel 12 having a suitably shaped and sized cutout 14 therein. By way of example, screws may be used as the fastening means to secure the indicator to the panel although it should be understood that other arrangements may also be employed. Housing 18 which may be in the form of a drawn brass can contains the indicator mechanism now to be described.

Coil assembly 20, comprised of a suitable length of wire 22 wound around an insulating bobbin 24, is disposed in the bottom of housing 18. Leads 26 extend through the housing, such as by conventional feed-through terminals (not shown), in order to be connected to an external source of electrical power. Metal core 28 is disposed in the central opening of the bobbin to form one leg of the magnetic flux path.

A rotor, generally designated as 30, is journaled in housing 18 on transverse axle 32. The rotor is secured to the axle for rotation therewith about an axis parallel to the axis of the coil assembly. Further, and in order to minimize the size of the housing, the rotor is positioned as close to the coil assembly as possible. A pair of longitudinally disposed and diametrically opposed magnets 34 and 36 are embedded in the rotor surface and are rigidly affixed thereto. By way of example, and for purposes of illustration only the surface of the rotor bears the legends "HOT" and "COLD." In the assembled condition, as shown in FIG. 1 and FIG. 2, the legends are visible through window of cutout 14 in panel 12. It is to be understood, of course, that other means for displaying alternative conditions to be monitored may be employed such as different legends or different colored areas.

Pole pieces 38 and 40 are conveniently secured within housing 18 at the ends of core 28. In the energized state of the electromagnet, core 28, pole pieces 38 and 40, together with magnet 34 complete the flux path. Permanent magnet 42 is secured to housing 18 parallel to the longitudinal axis of rotor 30. Magnet 42 is of substantially the same configuration as rotor magnets 34 and 36. Magnet 42 is oriented so that it attracts rotor magnet 36, thereby turning the rotor through 90° to assume the de-energized position.

Lamps Q and color filters F provide a means of illuminating the rotor by transmitted light when this is desired.

In the preferred embodiment of the present invention, the housing is a thin walled drawn non-ferrous metal can approximately ½ inch long by ⅜ inch wide by ½ inch deep. The rotor is fabricated from a plastic such as Lexan which is translucent and which lends itself to internal lighting by means of transmitted light from lamps placed close to the rotor's ends. Filters placed between lamp and rotor provide a means of using red or other color for illuminating the rotor. Alternatively, the rotor may be made from opaque non-magnetic material, including metal, provided that illumination is by incident light rather than transmitted light. The rotor axle may be a through non-ferrous metal pin or it may consist of pins pushed into centers at the ends of the rotor.

The coil assembly comprised of a core member of low retentivity, such as silicon steel, an insulating bobbin surrounding the core, and a length of insulated wire wound round the body of the bobbin between the end flanges thereof. It has been found that 5000 turns of AWG No. 42 copper wire, when energized with 30 volts DC, will produce a magnetic field sufficient to reliably angularly displace the rotor 90°.

As may be observed in the drawing, the pair of pole pieces are substantially the same width as the core member as well as the rotor magnets. The pole pieces, which are of low retentivity material such as silicon steel, are secured to the inside of the housing by means as simple as an adhesive. One end of each pole piece terminates proximate the periphery of the rotor directly opposite the rotor magnet faces. The spacing between fixed position magnet 42 and the rotor periphery is approximately ¼-inch.

Figure 3:
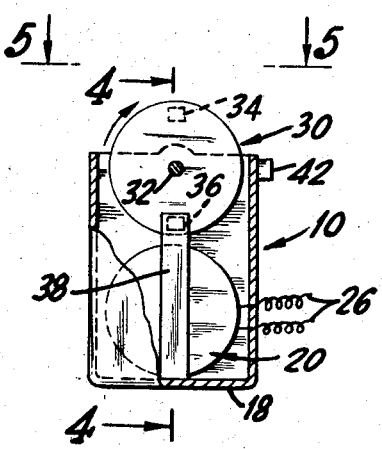
FIG. 3 is an enlarged end elevational view of the present invention with the housing therefor partially broken away, the coil being in the energized condition.
Figure 4:
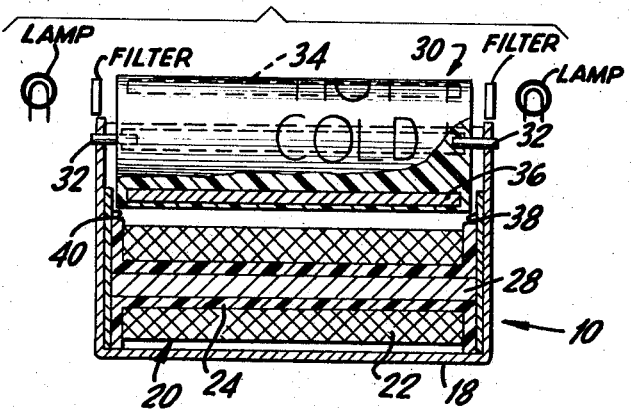
FIG. 4 is an enlarged side elevational view in section of the present invention taken along line 4—4 of FIG. 3.
Figure 5:
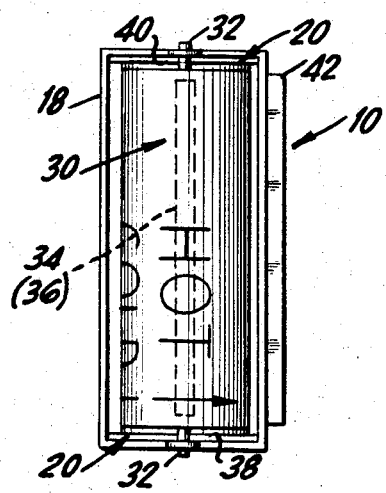
FIG. 5 is an enlarged plan view of the present invention taken along line 5—5 of FIG. 3.
Figure 6:
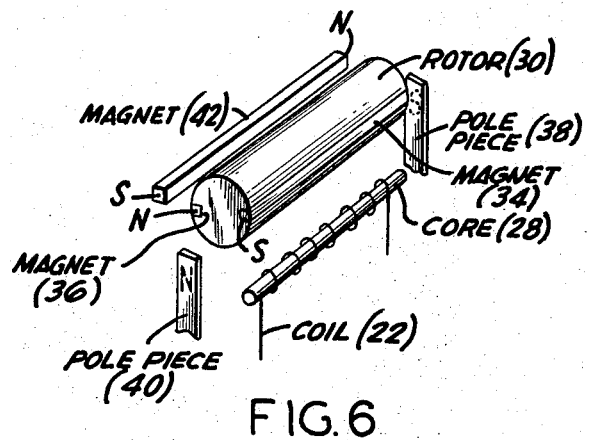
FIG. 6 is a schematic illustration of the electromagnetic indicator comprising the present invention.

Permanent magnets 34, 36 and 42 are magnetized longitudinally with the polarities shown in FIG. 6. The electromagnet, when energized, produces a field of polarity shown in FIG. 6. When the electromagnet is unenergized the NS ends of magnet 42 attract the SN ends of rotor magnet 36, positioning the rotor in the manner shown in FIG. 6. When the electromagnet is energized, the NS ends of pole pieces 40 and 38, respectively, attract the SN ends of rotor magnet 34, while repelling the NS ends of rotor magnet 36, overcoming the magnetic attraction between the magnets 42 and 36 and causing the rotor to turn through 90° and to position as shown in FIG. 3. When the electromagnet is de-energized, magnet 42 will attract rotor magnet 36 whereupon the rotor will return through 90° to its unenergized position.

In FIG. 6 the magnet 42 is in the so-called nine o'clock position relative to rotor 30 as viewed from the end. If the magnet 42 were to be placed in the eleven o'clock position, then the rotor 30 would rotate 30° when coil 22 is energized. On the other hand, if the magnet 42 were placed in the eight o'clock position, the rotor 30 would rotate 120° upon coil energization.

The use of magnets positioned as shown in the drawing eliminates the need for stop members required by the prior art. The device may be made extremely compact, yet has the ruggedness and reliability required for aircraft applications. Cost is kept to a minimum by the simplicity of the design which avoids the use of special bearing materials such as jewels for effective operation. The structure of the present invention lends itself to the incorporation of preferred backlighting systems.

There have been disclosed heretofore the best embodiments of the invention presently contemplated and it is to be understood that various changes and modifications may be made by those skilled in the art without departing from the spirit of the invention.

What is claimed is:

1. An electromagnetic condition responsive indicator for use with an externally powered electrical circuit to be monitored, said indicator comprising:
   (a) a non-magnetizable housing;
   (b) electromagnetic means including an elongated ferrous core of low retentivity disposed within said housing and a winding surrounding said core and adapted for connection to the circuit to be monitored;
   (c) rotor means rotatably supported for rotation within said housing about an axis spaced from and parallel to the longitudinal axis of said core;
   (d) first and second elongated permanent magnets each having a north-seeking pole and south-seeking pole on diametrically opposed faces of the rotor parallel to the rotor axis, said magnets being oppositely oriented relative to the other;
   (e) a pair of pole pieces disposed in close proximity to the transverse ends of said core and in a plane perpendicular to the longitudinal axis of said first and second magnets and said core, said pole pieces terminating at one end proximate to the locus of the fields extending from the transverse end faces of said first and second magnets, and arranged to be in the influence of the field of no more than one of said magnets at a given time; and
   (f) a third elongated permanent magnet fixed in position with respect to said core, said third magnet having a north-seeking pole and a south-seeking pole, said third magnet being positioned in closed, spaced, parallel relation to said first and second magnets.

2. The device in accordance with claim 1 wherein said first and second magnets are mounted flush with the surface of said rotor.

3. The device in accordance with claim 1 wherein said rotor means is a translucent plastic having indicia thereon visible only when a predetermined current level is present in said winding.

4. The device in accordance with claim 2 wherein illumination means are positioned proximate said rotor for illuminating the interior thereof whereby the said indicia is backlighted.

No references cited.

JOHN W. CALDWELL, *Primary Examiner.*

H. I. PITTS, *Assistant Examiner.*